April 4, 1950
M. A. BECHT
2,502,638
METHOD OF EXTRUDING PLASTICS IN TUBULAR
FORM AND WRAPPING THE TUBING
Filed July 31, 1945
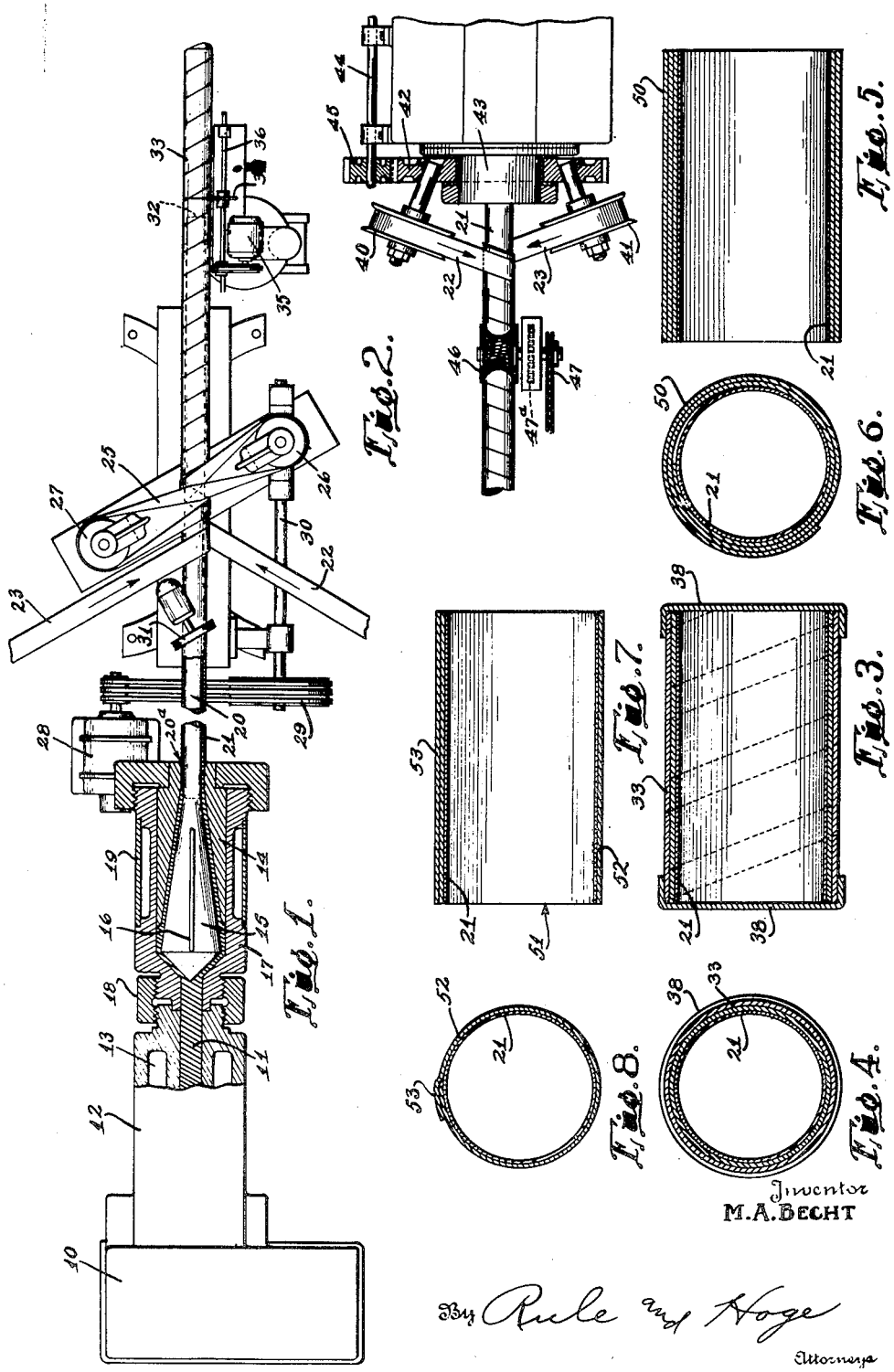
Inventor
M. A. BECHT
By Rule and Hoge
Attorneys Patented Apr. 4, 1950

2,502,638

UNITED STATES PATENT OFFICE 2,502,638

METHOD OF EXTRUDING PLASTICS IN TUBULAR FORM AND WRAPPING THE TUBING

Merrill A. Becht, Toledo, Ohio, assignor to Owens-Illinois Glass Company, a corporation of Ohio Application July 31, 1945, Serial No. 607,986

11 Claims. (Cl. 154—83)

1

My invention relates to the manufacture of tubing, tubular containers and other tubular articles provided with seamless liners.

An object of the invention is to provide a novel and practical method of making tubing of fibrous sheet material and concurrently forming and combining therewith a seamless lining of non-fibrous material such as an organic thermoplastic material which may be made into plastics, or other material adapted to provide a lining in the form of a thin sheet or film.

A further object of the invention is to provide a novel method of making tubing, such method comprising the extrusion of plastic lining material in tubular form from a supply body of the material to form a liner for the tubing and wrapping tube forming sheet material around the tubular liner as it hardens and while still integrally united with the supply body.

Still another object of the invention is to provide a tubular container having an interior lining consisting of a thin film or membrane in the form of a seamless tube, said lining consisting of any suitable material such as Cellophane or other plastic adapted to be formed into collapsible tubing.

Other objects of the invention will appear hereinafter.

Referring to the accompanying drawings:

Fig. 1 is a part sectional plan view of an apparatus for making cylindrical container bodies with seamless liners in accordance with my invention.

Fig. 2 is a similar view showing a different form of wrapping machine, parts being broken away.

Fig. 3 is a longitudinal sectional view of a container comprising a cylindrical body of spirally wound fibrous material and provided with a liner of plastic material.

Fig. 4 is a cross-section of the container shown in Fig. 3.

Fig. 5 is a longitudinal sectional view of a container body comprising convolute wound fibrous sheet material and provided with a similar liner.

Fig. 6 is a cross-sectional view of the same.

Fig. 7 is a longitudinal sectional view of a lapped seam container body of sheet material provided with a seamless liner.

Fig. 8 is a cross-sectional view of the same.

Referring to Fig. 1, the extruding machine 10, which may be a conventional machine of the screw feed type, feeds plastic material 11 forward through a conduit in a heater 12, provided with a heating chamber 13 in which steam or other heating fluid may be circulated. The material 11 may be an organic thermoplastic material adapted for making liners. The extruding die includes an outer die member 14 and a core 15. The core comprises a tapered body with longitudinal ribs 16 by which it is held centered within the hollow die member 14 with its correspondingly tapered interior walls spaced from the core to provide a forwardly convergent annular passageway through which the plastic material is advanced. The die members are mounted within an adaptor 17 attached by a coupling nut 18 to the member 12. The material 11 may be kept at the required elevated temperature while passing through the dies by circulating steam within a steam jacket 19 surrounding the adaptor.

A tube winding mandrel 20 in the form of a cylindrical rod which may be formed integrally with the core 15, extends horizontally forward from the core. There is thus formed a combination extruding die core and tube winding mandrel. The liner material 11 as it emerges from the dies at the annular outlet 20ª is still hot and in a soft or plastic condition and as it moves forward in the form of a tube 21 along the stationary mandrel 20, is gradually cooled and solidified. The surrounding air, which may be at ordinary room temperature, serves as a cooling and solidifying medium within which the material is solidified as it flows therethrough. It will be understood, however, that other cooling media may be employed for hardening or solidifying the material. Also, depending on the liner material employed, other means or methods may be used for setting or hardening the material, as for example, heating, drying, evaporation of solvents, or use of chemical reagents.

As the solidified tube 21 advances along the mandrel 20, it passes through a winding station at which it is wound with sheet material such as strips 22 and 23 of paper or other fibrous material which forms the body of the tube. A tube winding belt 25 is trained over a driving pulley 26 and a driven pulley 27, one strand of the belt being wrapped around the mandrel 20. The pulleys and belt are arranged in a conventional manner for winding the strips 22 and 23 spirally and feeding the tubing forward as it is formed by said strips. The belt is driven continuously by an electric motor 28 geared thereto through a belt 29 and shaft 30, the latter being geared to the pulley 26. The belt 25 operates to wind the paper strips tightly on the liner tube 21 and, owing to the frictional engagement of the inner strip 23 with the liner tube, operates to rotate the latter and at the same time feed it forward at the same rate as the surrounding tubing. The plastic condition of the lining material as it leaves the dies permits the liner tube to be rotated on the stationary mandrel, the material being sufficiently hardened by the time it reaches the winding station to retain its shape.

A power driven friction wheel 31, which may be geared to the motor 28, may be provided to rotate the tube 21 before it enters the paper winding station and also to assist in feeding it spirally forward with the tubing as a whole. The strips 22 and 23 are provided with a coating of adhesive material on their inner faces for securing them together and causing the inner layer formed of the strip 23 to adhere to the tubular lining. The adhesive material on the inner strip also serves to seal any pin holes or the like which may be formed in the liner tube 21.

The tubing, as it passes beyond the outer end 32 of the mandrel, is cut to uniform lengths for forming the container bodies 33 (Figs. 3 and 4), by means of a disk cutter 34. The cutter and its operating mechanism may be of conventional construction. As herein shown, the cutter is driven by an electric motor 35 geared to a shaft 36 carrying the cutter disk and rotated at a high speed. The cutter mechanism may be mounted to reciprocate toward and from the mandrel for moving the cutter to and from cutting position. The shaft 36 may also be mounted for lengthwise movement to permit the cutter to advance with the tubing during the cutting operation.

As shown in Figs. 3 and 4, the container includes end pieces 38 made of sheet metal or other material and seamed onto the body 33 in accordance with conventional methods.

Fig. 2 illustrates a form of apparatus alternative to that shown in Fig. 1 for forming the tubing. This apparatus includes an extrusion die which may be substantially the same as that shown in Fig. 1 for forming the tubular liner. With the Fig. 2 construction, the strips 22 and 23 are fed from rolls 40 and 41 carried on an annular gear 42 mounted for rotation on the stationary head 43 of the extrusion die. The gear 42 may be rotated continuously by means of a power driven shaft 44 carrying a pinion 45 running in mesh with the gear 42. As the gear 42 rotates, the rolls 40 and 41 carried therewith revolve about the axis of the stationary mandrel 20, so that the strips 22 and 23 are wound spirally or helically on the mandrel.

The tubing as it is formed is fed forward by means of a pair of feed rolls 46 which may be positioned above and below the mandrel and rotated by means of a power driven sprocket chain and wheel 47. Intermeshing gears 47ª on the feed roll shafts provide a positive drive for the lower roll. The driving speed of the feed rolls is synchronized with that of the roll carrying gear 42. The feed rolls are knurled to grip the tubing and prevent slippage. They also apply the needed pressure for causing the strips to be wound smoothly and compactly and also tightly on the liner tube 21. It will be noted that with this form of winding apparatus there is no rotation of the liner tube and no twisting action applied to the lining material as it is drawn forward.

When it is desired to use a preformed lining material such as, for example, a collapsible seamless tubular membrane of cellophane, the tube of lining material may be inflated or expanded and then drawn lengthwise over a mandrel, such as the mandrel 20. The diameter of the mandrel, which may be uniform throughout its length, will correspond to the size or interior diameter of the expanded tube so that the latter is held in its fully expanded tubular form while advancing along the mandrel. The strips 22 and 23 may be wound on the tubular lining membrane in the manner above described, using apparatus such as shown in either Fig. 1 or Fig. 2.

Figs. 5 and 6 illustrate a modified form of container body which comprises a convolute wound sheet 50 of paper or other material. The sheet 50 may be cut to size prior to the winding and is wound on the liner tubing as the latter is drawn forward on the mandrel and before severance of the liner from the supply body of lining material. The body 50 may comprise two or more superposed plies of layers.

Figs. 7 and 8 illustrate a container body 51 formed by wrapping a prefabricated sheet 52 of material around the liner 21 while the latter is on the mandrel, the edges of the sheet being overlapped and forming a lap seam 53.

In each of the methods of making the several forms of container bodies illustrated, the stationary mandrel 20 serves as a backing or means for holding the liner tubing in shape and preventing collapse while the paper strips or other sheet material is being wound thereon. Although the strips of paper or fibrous material which form the container bodies herein illustrated and made in the manner above described, are adapted to the making of containers which during normal use are not collapsed, other materials such as metal foil or sheets or strips of thermoplastic material may be used in combination with the liner tubing herein disclosed, for making containers and tubes which are designed and adapted to be collapsed.

The speed at which the liner tube is drawn forward either by the winding belt 25 (Fig. 1), the feed rolls 46 (Fig. 2), or other drawing means, is synchronized with the rate at which the material is extruded from the die so that a uniform thickness of the liner is obtained. The rate of feeding is also adjustable for the purpose of adjusting the wall thickness of the tubular liner, the speed being sufficient to stretch the material so that the wall thickness of the solidified portion of the tubing is substantially less than at the outlet 20ª of the dies.

Modifications, both of the methods disclosed, the apparatus for practicing such methods, and of the tubes or containers made thereby, may be resorted to within the spirit and scope of my invention.

I claim:

1. The method which comprises extruding material in plastic condition and in tubular form from a supply body of the material, feeding the extruded material forward in tubular form through a solidifying medium by which the material is caused to solidify as it advances, maintaining the material during said advance in substantially the said tubular form in which it is extruded from the supply body, and wrapping the tube after said solidification with a body forming sheet material while the said tube is still integrally united with the supply body.

2. The method which comprises extruding material in plastic condition and in tubular form from a supply body of the material, feeding the extruded material forward in tubular form through a solidifying medium by which the material is caused to solidify as it advances, maintaining the material during said advance in substantially the said tubular form in which it is extruded from the supply body, wrapping sheet material around the said tube after said solidification, and supporting the tubing internally against collapse during said winding.

3. The method which comprises continuously extruding plastic lining material in tubular form from an extruding die and simultaneously applying a drawing force to the extruded material at a position in advance of the die and thereby drawing the material forward in the form of a tube as it is extruded, applying solidifying means to the lining material during its passage from the die to the drawing position and thereby producing a solidified tubing, and wrapping sheet material spirally around the lining material as the latter is drawn.

4. The method which comprises drawing thermoplastic material in tubular form from a supply body of the material in plastic condition by a drawing force applied directly to the formed tube at a point spaced in advance of the zone in which the tube is formed, supporting the tubing as it is drawn by a mandrel positioned within the tubing, and wrapping the tubing with sheet material as it is drawn.

5. The method which comprises drawing thermoplastic material in tubular form from a supply body of the material in plastic condition by a drawing force applied directly to the formed tube at a point spaced in advance of the zone in which the tube is formed, supporting the tubing as it is drawn by a mandrel positioned within the tubing, and wrapping the tubing with sheet material as it is drawn, thereby forming tubing of sheet material with a thermoplastic seamless liner therein, and severing the tubing into predetermined lengths as it is formed.

6. The method which comprises extruding thermoplastic material in tubular form from a supply body of the material in plastic condition, drawing the material forward in the form of a tube as it is extruded by a drawing force applied directly to the formed tube at a point spaced in advance of the zone in which the tube is formed, causing the material to solidify as it is drawn, rotating the solidified tube while still united with the supply body, and concurrently winding a strip of sheet material spirally on the said tube of lining material.

7. The method which comprises forcing thermoplastic material continuously through an extrusion die and causing said material to emerge from the die in tubular form, drawing the material forward in the form of a tube as it is extruded by a continuous drawing force applied directly to the formed tube at a point spaced in advance of the die, supporting said tube on a stationary mandrel extending lengthwise within the tube, solidifying said tube as it is drawn, and winding a strip of sheet material on the tube as the latter is being drawn.

8. The method which comprises continuously extruding plastic material in tubular form through a die, applying to the tube at a point spaced in advance of the die, a drawing force in the direction of movement of the tube, and wrapping the tube as it is formed by a strip of sheet material applied to the tube at a position intermediate the die and said drawing point.

9. The method defined in claim 8 wherein the said material is subjected to the influence of a solidifying medium during its passage from the die to said drawing point and the tube thereby solidified before it reaches said drawing point.

10. The method of forming a tube which comprises extruding material in plastic condition and tubular form through a die, passing the extruded material through a solidifying medium and thereby hardening and solidifying the tube, applying to the tube a combined forward pull and rotative force by which the solidified tube is rotated and simultaneously advanced in the direction of its length, and connecting strips of sheet material with the tubing and causing the tubing by said movement to wrap itself with the said strips.

11. The method of forming a tube which comprises extruding material in plastic condition and tubular form through a die, passing the extruded material through a solidifying medium and thereby hardening and solidifying the tube, applying to the tube a combined forward pull and rotative force by which the solidified tube is rotated and simultaneously advanced in the direction of its length, supplying to the advancing tube, strips of sheet material, and rotating and advancing the tube by a driving belt surrounding a wrapped portion of the tube and thereby effecting a wrapping of said strips around the advancing tube.

MERRILL A. BECHT.

REFERENCES CITED

The following references are of record in the file of this patent:

UNITED STATES PATENTS

| Number | Name | Date |
|---|---|---|
| 841,539 | Kimsey | Jan. 15, 1907 |
| 1,242,903 | Angier | Oct. 16, 1917 |
| 1,390,644 | Ritchie | Sept. 13, 1921 |
| 1,676,351 | Robinson | July 10, 1928 |
| 2,309,903 | Hume | Feb. 2, 1943 |
| 2,354,556 | Stahl | July 25, 1944 |
| 2,389,725 | Gillis et al. | Nov. 27, 1945 |